US012754114B2

(12) United States Patent
Yu et al.

(10) Patent No.: US 12,754,114 B2
(45) Date of Patent: Oct. 6, 2026

(54) DESORBED GAS AMOUNT TESTING DEVICE AND MEASURING METHOD

(71) Applicants: CHINA PETROLEUM & CHEMICAL CORPORATION, Beijing (CN); SINOPEC EXPLORATION & PRODUCTION RESEARCH INSTITUTE, Beijing (CN)

(72) Inventors: Lingjie Yu, Beijing (CN); Ming Fan, Beijing (CN); Yongqiang Zhao, Beijing (CN); Zongquan Hu, Beijing (CN); Huasheng Qi, Beijing (CN); Changbo Zhai, Beijing (CN); Cheng Tao, Beijing (CN); Qigui Jiang, Beijing (CN); Longfei Lu, Beijing (CN); Wentao Zhang, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 224 days.

(21) Appl. No.: 18/853,568

(22) PCT Filed: Feb. 7, 2023

(86) PCT No.: PCT/CN2023/074685
§ 371 (c)(1),
(2) Date: Oct. 2, 2024

(87) PCT Pub. No.: WO2023/193514
PCT Pub. Date: Oct. 12, 2023

(65) Prior Publication Data

US 2025/0224320 A1 Jul. 10, 2025

(30) Foreign Application Priority Data

Apr. 6, 2022 (CN) ........................ 202210359907.1

(51) Int. Cl.
*G01N 7/14* (2006.01)

(52) U.S. Cl.
CPC .................................... *G01N 7/14* (2013.01)

(58) Field of Classification Search
CPC ...................................................... G01N 7/14
(Continued)

(56) References Cited

U.S. PATENT DOCUMENTS 5,544,208 A * 8/1996 Pao ........................ G01N 30/62 376/253
9,269,462 B2 * 2/2016 Ahlfeld ................. G21C 3/041
(Continued)

FOREIGN PATENT DOCUMENTS

CN 201368838 Y * 12/2009
CN 109307542 A * 2/2019 ............ G01F 22/02
CN 209727682 U 12/2019

*Primary Examiner* — Marrit Eyassu
(74) *Attorney, Agent, or Firm* — NKL Law; Allen Xue

(57) ABSTRACT

A device for measuring the amount of desorbed gas has a sample desorption tank; a water drain metering assembly that has a metering tube configured to display a liquid level height and receive gas desorbed from the sample desorption tank, the metering tube being connected to a draining and injecting assembly for draining or injecting water, a first pressure monitoring member for monitoring a liquid pressure in the metering tube, and a second pressure monitoring member for monitoring a gas pressure in the metering tube; a gas exhausting assembly that is in communication with the water drain metering assembly and configured to exhaust desorbed gas therein; and a control assembly for controlling the desorbed gas to enter the metering tube, controlling the draining and injecting assembly to drain water, controlling
(Continued)

the gas exhausting assembly to exhaust gas, and controlling the draining and injecting assembly to inject water.

13 Claims, 2 Drawing Sheets

(58) Field of Classification Search
USPC ........................................................ 73/19.05
See application file for complete search history.

(56) References Cited

U.S. PATENT DOCUMENTS

| | | | |
|---|---|---|---|
| 2011/0239732 | A1 | 10/2011 | Zhang et al. |
| 2015/0369715 | A1 | 12/2015 | Du |

* cited by examiner

DESORBED GAS AMOUNT TESTING DEVICE AND MEASURING METHOD

TECHNICAL FIELD

The present invention relates to the technical field of unconventional oil and gas exploration and development device, and specifically to a desorbed gas amount testing device and measuring method.

TECHNICAL BACKGROUND

Shale gas, as a clean energy, has attracted wide attention in its exploration and development. China has made great breakthroughs in the commercial development of shale gas. The evaluation of gas content of shale can provide the most direct and critical parameters for resource evaluation and optimization of favorable area, thus playing an irreplaceable role in shale gas exploration and development. Gas content testing method is divided into two categories, i.e., direct testing method and indirect acquisition method (isothermal adsorption and log curve method). On-site direct testing method is the first choice for measurement of shale gas content due to its high credibility, convenience, economy and efficiency.

Device for direct gas content measurement on drilling and coring site works based on two principles, namely, measurement of mass flow rate, and measurement through water drainage and gas collection method. As for the first principle, the volume should be measured based on the premise that the gas has a single composition, or the compositions of the gas remain unchanged. For measurement of different gases, conversion is required in order to obtain the real measured volume. In particular, the gas compositions in shale sample will change as the desorption time goes on during on-site desorption, accompanied by a small amount of water vapor. As a result, there will be large errors in the measured value, which directly affect the reliability and accuracy of the measured results.

Compared with the first principle, the conventional water drainage and gas collection method can measure the desorbed gas amount on site more reliably. At present, devices based on this principle have been widely applied to on-site measurement of gas content in shale. A method of measuring desorbed gas volume in shale with servomotor is disclosed in the prior arts. However, the servomotor is large in size and heavy, and one such device can only measure a limited number of samples, which is time-consuming and laborious. Therefore, it is unable to measure shale samples with high densities efficiently and conveniently, failing to adapt to the fast coring work on site. A device for automated volume measurement and determination of high-density coring samples is also disclosed in the prior arts, which calculates the actual volume of gas based on electronic pressure sensor and water column height. The device is highly automated, convenient and efficient, which, however, relies on gas expansion method to convert the desorbed gas volume. Since the gas expansion is susceptible to temperature, the precision of the sensor, etc, the volume measurement is prone to large errors, failing to provide the precise gas content data in shale.

Therefore, there are problems in existing devices and methods for measuring desorbed gas amount of shale on site, which cannot provide accurate and reliable on-site data conveniently and quickly.

In summary, there is an urgent need for a highly automated testing device for measuring desorbed gas amount of shale on site precisely, in order to accommodate to the efficient and fast evaluation of desorbed gas amount for on-site coring.

SUMMARY OF THE INVENTION

In view of the above technical problems in the prior arts, the present application proposes a desorbed gas amount testing device and measuring method, which is highly automated and can measure desorbed gas amount of shale on site precisely.

A desorbed gas amount testing device according to the present invention, comprising:

- a sample desorption tank, for storing a sample to be desorbed and providing a desorption environment for the sample to be desorbed;
- a water drain metering assembly, comprising a metering tube which is configured to display a liquid level height and receive gas desorbed from the sample desorption tank, the metering tube being connected to a draining and injecting assembly for draining or injecting water, a first pressure monitoring member for monitoring a liquid pressure in the metering tube, and a second pressure monitoring member for monitoring a gas pressure in the metering tube;
- a gas exhausting assembly, which is in communication with the water drain metering assembly and configured to exhaust desorbed gas therein; and
- a control system, for controlling the desorbed gas to enter the metering tube, controlling the draining and injecting assembly to drain or inject water, and controlling the gas exhausting assembly to exhaust the desorbed gas,
- wherein the control system is configured to, when the desorbed gas enters the metering tube, control a speed at which the draining and injecting assembly drains water, so that the second pressure monitoring member remains in a non-pressurized state; and
- the control system is further configured to, when a pressure of the first pressure monitoring member reaches a set minimum value, suspend the desorbed gas entering the metering tube, control the gas exhausting assembly to exhaust gas, and control the draining and injecting assembly to inject water into the metering tube, until the pressure of the first pressure monitoring member reaches a set maximum value.

A further improvement of the present invention is that an elastic sleeve is arranged within the sample desorption tank and connected to a pressurizing and depressurizing mechanism, which is configured to pressurize or depressurize the sample to be desorbed in the sample desorption tank through the elastic sleeve, a compacting mechanism for compacting the sample to be desorbed being arranged on an upper portion of the sample desorption tank.

A further improvement of the present invention is that an upper retaining ring and a lower retaining ring are arranged on an inner wall of the sample desorption tank, and the elastic sleeve comprises a vertical first rubber sleeve which is provided with an upper edge at an upper end thereof and a lower edge at a lower end thereof,

- wherein the upper edge is sealingly connected to the upper retaining ring, and the lower edge is sealingly connected to the lower retaining ring, with an annular space formed between the inner wall of the sample desorption tank and an outer wall of the elastic sleeve, the pressurizing and depressurizing mechanism being configured to pressurize or depressurize the annular space.

A further improvement of the present invention is that a top cover is arranged at a top portion of the sample desorption tank, and the compacting mechanism comprises a second rubber sleeve arranged on the top cover, wherein a resilient member is arranged between the second rubber sleeve and the top cover, and configured to enable the second rubber sleeve to compact the sample to be desorbed through resilience.

A further improvement of the present invention is that a plurality of metering tubes is provided in parallel inside a box, each of the metering tubes being connected to a corresponding sample desorption tank, and a sealing joint connected to the metering tube is provided at each of upper and lower portions of the box, wherein a pressing spring is provided on the sealing joint at the upper portion of the box, and the metering tube is detachable through the pressing spring.

A further improvement of the present invention is that a number of metering tubes with different sizes are provided, each of which has a same joint at each end thereof, and a scaled central body with a different diameter, wherein a suitable metering tube is selected for the number of metering tubes with different sizes based on precision as needed in testing.

A further improvement of the present invention is that the metering tube includes a gas inlet and outlet port and a water inlet and outlet port, wherein the sample desorption tank is connected to the gas inlet and outlet port via a first line, and the draining and injecting assembly is connected to the water inlet and outlet port; and the gas exhausting assembly is connected to the gas inlet and outlet port via a second line.

A further improvement of the present invention is that the water inlet and outlet port comprises a water inlet port and a water outlet port, and the draining and injecting assembly comprises a water tank which is connected to the water inlet port via an inject line and the water outlet port via a drain line, wherein an injecting pressure servo valve is arranged on the inject line, and a draining pressure servo valve is arranged on the drain line.

A further improvement of the present invention is that the gas inlet and outlet port of the metering tube is connected to a tee, which is further connected to the first line and the second line; and the second pressure monitoring member and an inlet valve are arranged on the first line, and a discharging valve is arranged on the second line.

According to another aspect of the present invention, a method for measuring desorbed gas amount of a sample to be desorbed is proposed, which is performed by means of the desorbed gas amount testing device, and comprises:

Step 1, placing the sample to be desorbed in the sample desorption tank for heating and desorption;

Step 2, delivering the desorbed gas into the metering tube, draining water through the draining and injecting assembly to keep the second pressure monitoring member in a constant non-pressurized state, and discharging the gas in the metering tube and injecting water through the draining and injecting assembly to an initial state when a liquid pressure in the metering tube monitored by the first pressure monitoring member reaches a minimum value, thereby completing one cycle of desorption;

Step 3, calculating the desorbed gas amount in one cycle; and

Step 4, calculating a total desorbed gas amount based on liquid level heights in the metering tube at a start time and an end time, and a number of cycles.

A further improvement of the present invention is that the desorbed gas amount in one cycle is calculated with an equation as follows:

$$Vmax = Hmax * S,$$

wherein Hmax denotes a maximum liquid level difference in the metering tube, and S denotes an area of a cross-section of the metering tube.

A further improvement of the present invention is that a set maximum pressure value in the metering tube is Pmax, and a set minimum pressure value in the metering tube is Pmin, the method further comprising:

when a water column pressure P monitored by the first pressure monitoring member reaches Pmin, stopping the desorbed gas from entering the metering tube, turning on the gas exhausting assembly, and controlling the draining and injecting assembly to inject water to the metering tube, through the control system; and when the water column pressure P monitored by the first pressure monitoring member reaches Pmax, turning off the gas exhausting assembly, discharging the desorbed gas into the metering tube, and controlling the draining and injecting assembly to discharge water from the metering tube.

A further improvement of the present invention is that assuming readings of the water column pressure are P1 and P2 at any two times T1 and T2 respectively, and gas is discharged from the metering tube in n cycles during an interval between two measurements, the desorbed gas amount during the interval is calculated as follows:

$$V = (P1 - Pmin + Pmax - P2)S/\rho g + nVmax,$$

wherein S denotes the area of the cross-section of the metering tube, ρ denotes a density of the liquid in the metering tube, and g denotes gravity acceleration; and the method further comprises converting the desorbed gas amount to an amount in a standard state based on temperatures and atmospheric pressures recorded at different times.

The above technical features may be combined in various suitable manners or replaced with equivalents thereof, as long as the purpose of the present invention can be achieved.

Compared with the prior arts, the desorbed gas content testing device and measuring method according to the present invention may have at least the following beneficial effects.

Compared with the desorbed gas amount testing device and measuring method in the prior arts, there is no need to take the composition of the desorbed gas into consideration in the desorbed gas amount testing device according to the present application, which is able to realize automated volumetric metering through the change in liquid level pressure. Therefore, the measuring method according to the present application is convenient and fast with small error and high precision, and can measure the desorbed gas amount of the on-site gas content in shale accurately. The pressure and the liquid level height of water column in the metering tube are measured by the water drain metering assembly, and substituted into the desorbed gas amount measurement formula, in order to calculate the desorbed gas amount in a single cycle. Then the desorbed gas amounts in a plurality of consecutive single cycles are added up to obtain the desorbed gas amount of the sample to be desorbed.

BRIEF DESCRIPTION OF THE DRAWINGS

The present invention will be described below in more detail based on the embodiments with reference to the accompanying drawings.

Figure 1:
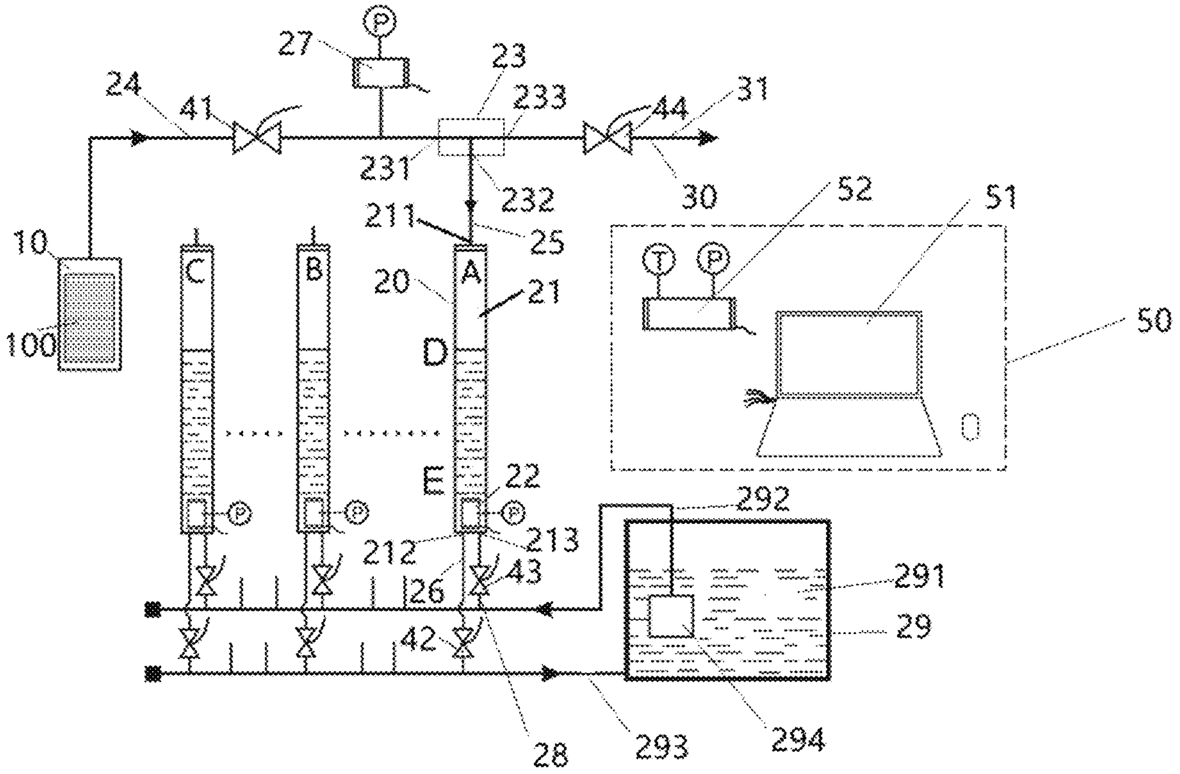
FIG. 1 schematically shows a structure of a desorbed gas amount testing device according to the present invention.

In the drawings, the same reference signs are used to indicate the same components. The drawings are not necessarily drawn to actual scales. The reference signs in the drawings are as follows:

10 sample desorption tank;
11 elastic sleeve;
111 first rubber sleeve;
112 upper edge;
113 lower edge;
12 pressurizing and depressurizing mechanism;
13 compacting mechanism;
131 second rubber sleeve;
132 resilient member;
141 top cover;
142 upper retaining ring;
143 lower retaining ring;
15 condensate water collecting assembly;
16 liquid receiving tray;
20 water drain metering assembly;
21 metering tube;
211 gas inlet and outlet port;
212 water outlet port;
213 water inlet port;
22 first pressure monitoring member;
23 tee;
231 first inlet and outlet;
232 second inlet and outlet;
233 third inlet and outlet;
24 first line;
25 second line;
26 drain line;
27 second pressure monitoring member;
28 water inject line;
29 draining and injecting assembly;
29 water tank;
292 inlet pipe;
293 outlet pipe;
294 normally-open submersible pump;
30 gas exhausting assembly;
31 exhaust line;
41 first control valve;
42 drain pressure servo valve;
43 inject pressure servo valve;
44 fourth control valve;
50 control assembly;
51 computer control system;
52 atmospheric environment sensor; and
100 sample to be desorbed.

DETAILED DESCRIPTION OF EMBODIMENTS

The present invention will be described below in detail with reference to the accompanying drawings.

It should be noted that a sample to be desorbed 100 in the present application is a shale sample collected on site, and a desorbed gas amount testing device according to the present application is configured to measure the desorbed gas amount of the on-site gas content in shale.

As shown in FIG. 1, the present invention proposes a desorbed gas amount testing device, which comprises a sample desorption tank 10, a water drain metering assembly 20, a gas exhausting assembly 30, and a control system.

The sample desorption tank 10 is configured to store the sample to be desorbed 100. The water drain metering assembly 20 is in communication with the sample desorption tank 10 for measuring the desorbed gas generated by the sample to be desorbed 100. The gas exhausting assembly 30 is in communication with the water drain metering assembly 20 for exhausting the desorbed gas therein. The water drain metering assembly 20 comprises a metering tube 21 and a first pressure monitoring member 22 arranged at a bottom portion of the metering tube 21, wherein the metering tube 21 is configured to meter a liquid level height of the water column therein, and the first pressure monitoring member 22 is configured to collect a pressure value of the water column in real time. A draining and injecting assembly 29 for draining or injecting water is provided at the bottom portion of the metering tube 21, and a second pressure monitoring member 27 is connected to an upper portion thereof for monitoring the gas within the metering tube 21.

In this embodiment, the desorbed gas amount testing device further comprises a control system, which is configured to control the desorbed gas to enter the metering tube 21, control the draining and injecting assembly 29 to drain or inject water, and control the gas exhausting assembly 30 to exhaust the desorbed gas. When the desorbed gas enters the metering tube 21, the control system controls a speed at which the draining and injecting assembly 29 drains water, so that the second pressure monitoring member 27 remains in a non-pressurized state (that is, its pressure is the same as the outer ambient pressure, with a reading close to 0). When the pressure of the first pressure monitoring member 22 reaches a set minimum value, the control system suspends the desorbed gas entering the metering tube 21, but controls the gas exhausting assembly to exhaust gas and controls the draining and injecting assembly to inject water into the metering tube, until the pressure of the first pressure monitoring member 22 reaches a set maximum value. In this manner, a measurement cycle is completed. In this embodiment, the control system comprises an electronic computer and a control program.

In the above arrangement, the pressure value and the liquid level height of the water column in the metering tube 21 are measured by the water drain metering assembly, and substituted into the desorbed gas amount measuring formula, so as to calculate the desorbed gas amount in a single cycle. Then the desorbed gas amounts in a plurality of consecutive single cycles are added up to obtain the desorbed gas amount of the sample to be desorbed 100. Compared with the desorbed gas amount testing device and the measuring method in the prior arts, there is no need to take the composition of the desorbed gas into consideration in the desorbed gas amount testing device according to the present application, which is able to realize automated volumetric metering through the change in liquid level pressure. Therefore, this measuring method is convenient and fast with small error and high precision, and can measure the desorbed gas amount of the on-site gas content in shale accurately.

Figure 2:
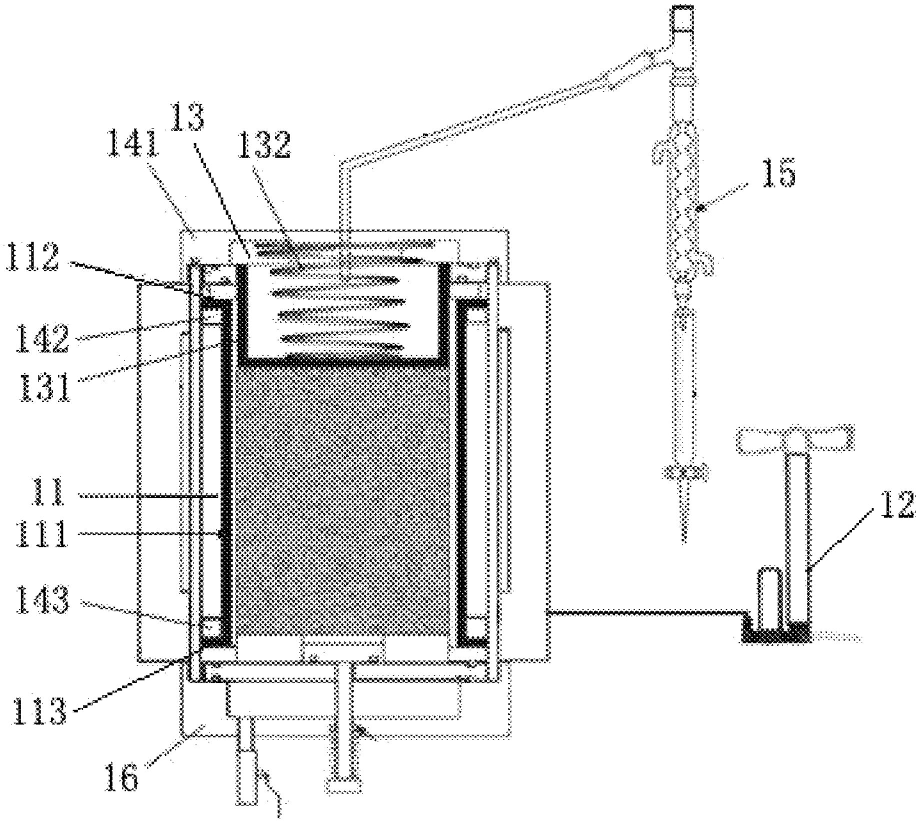
FIG. 2 schematically shows a structure of a sample desorption tank.

As shown in FIG. 2, an elastic sleeve 11 is arranged within the sample desorption tank 10, and connected to a pressurizing and depressurizing mechanism 12. The pressurizing and depressurizing mechanism 12 is configured to pressurize or depressurize the sample to be desorbed in the sample desorption tank 10 through the elastic sleeve 11. A compacting mechanism 13 for compacting the sample to be desorbed is arranged on an upper portion of the sample desorption tank 10.

Specifically, the elastic sleeve 11 arranged within the sample desorption tank 10 has an I-beam shape in its vertical cross-section. A vertically-extending and cylindrical first rubber sleeve 111 is provided at a center portion of the elastic sleeve 11, and a horizontal annular structure is arranged on each of upper and lower sides of the elastic sleeve 11, thus forming an upper edge 112 and a lower edge 113 respectively. An upper retaining ring 142 and a lower retaining ring 143 are arranged on an inner wall of the sample desorption tank 10, wherein an upper edge of the sample desorption tank 10 is sealingly connected to the upper retaining ring 142, and a lower edge thereof is sealingly connected to the lower retaining ring 143. An annular space is formed between the inner wall of the sample desorption tank 10 and an outer wall of the elastic sleeve 11, and can be pressurized or depressurized by the pressurizing and depressurizing mechanism 12. When the pressurizing and depressurizing mechanism 12 exerts pressure into the annular space, the first rubber sleeve 111 expands inwardly under the pressure due to its elasticity, thereby clamping the sample to be desorbed, in order to accommodate different types of rocks.

The compacting mechanism 13 is arranged on the upper portion of the sample desorption tank 10, for radially compacting the sample to be desorbed. Due to the elastic sleeve 11 and the compacting mechanism 13, the desorbed gas amount testing device is able to accommodate rock samples with different sizes and types, thus easily contracting the empty volume after the core is loaded in the tank to hold the core stably.

Specifically, a top cover 141 is arranged at a top portion of the sample desorption tank 10. The compacting mechanism 13 comprises a second rubber sleeve 131 arranged on the top cover. A resilient member 132 is arranged between the second rubber sleeve 131 and the top cover 141, and enables the second rubber sleeve 131 to compact the sample to be desorbed through its resilience.

In addition, a condensate water collecting assembly 15 is arranged on an exhaust line above the sample desorption tank 10, and a liquid receiving tray 16 is arranged at a lower end of the sample desorption tank 10.

Specifically, in one embodiment, the first pressure monitoring member 22 is a pressure sensor, and the metering tube 21 is a glass tube with a fixed scale, which facilitates visualization of changes in the desorbed gas and liquid level in the glass tube.

Specifically, as shown in FIG. 1, in one embodiment, the glass tube is detachable and replaceable. Therefore, glass tubes of suitable diameters can be replaced to adapt to gas metering for samples with different desorbed gas amounts and rates, so that the data can be more precise and reliable.

Specifically, a plurality of metering tubes is provided in parallel inside a box. Each of the metering tubes is connected to a corresponding sample desorption tank, so that a plurality of rock samples can be desorbed at the same time. A sealing joint connected to the metering tube is provided at both upper and lower portions of the box, wherein a pressing spring is provided on the sealing joint at the upper portion of the box, and an embedded O-ring is provided within the sealing joint. The spring seals the glass tube by pressing top and bottom portions thereof, and the metering tube is detached through the pressing spring. The pressing spring in this embodiment facilitates more convenient and faster disassembly and installation compared with threads or clamps.

Preferably, a number of metering tubes with different sizes are provided. These metering tubes have the same joints at both ends thereof, but different diameters at respective central bodies with scales. A suitable metering tube is selected for the number of metering tubes with different sizes based on precision as needed in testing. When the gas amount is small, a thin metering tube can be used, so that the change in liquid level is more obvious, and the measurement can be more precise.

Specifically, as shown in FIG. 1, in one embodiment, there are glass tubes of types A, B, and C, etc., wherein glass tube A is connected to the device, while glass tubes B, C, etc. are not. In the present application, the glass tubes may be selected according to the actual desorbed gas amount and rate of the sample to be desorbed 100.

Specifically, as shown in FIG. 1, in one embodiment, the metering tube 21 includes a gas inlet and outlet port 211 and a water outlet port 212. The water drain metering assembly 20 further comprises a tee 23, a first line 24, a first control valve 41, and a second line 25. The tee 23 has a first inlet and outlet 231, a second inlet and outlet 232, and a third inlet and outlet 233 in communication with the gas exhausting assembly 30. One end of the first line 24 is connected to the sample desorption tank 10, and the other end thereof is connected to the first inlet and outlet 231. The first control valve 41 is arranged on the first line 24. One end of the second line 25 is connected to the gas inlet and outlet port 211, and the other end thereof is connected to the second inlet and outlet 232.

In the above arrangement, the first line 24 and the second line 25 are inlet lines for gas, through which the desorbed gas generated in the sample desorption tank 10 can pass through the metering tube 21 for water drainage and gas collection.

Specifically, in one embodiment, the first control valve 41 is a normally-open solenoid valve.

Specifically, as shown in FIG. 1, in one embodiment, the water drain metering assembly 20 further comprises a drain line 26 and a drain pressure servo valve 42, wherein one end of the drain line 26 is connected to the water outlet port 212, and the drain pressure servo valve 42 is arranged on the drain line 26.

In the above arrangement, the drain line 26 is able to drain the water from the metering tube 21, which ensures that the metering tube 21 is able to collect the desorbed gas, thus realizing the functions of water drainage and gas collection of the desorbed gas amount testing device.

Specifically, in one embodiment, the drain pressure servo valve 42 is a pressure servo valve.

Specifically, as shown in FIG. 1, in one embodiment, the second pressure monitoring member 27 is arranged on the first line 24, and between the first control valve 41 and the tee 23. The drain pressure servo valve 42 is able to control a drain rate of the drain line 26 based on the pressure monitored by the second pressure monitoring member 27.

In the above arrangement, since the drain pressure servo valve 42 is able to control the drain rate of the drain line 26 based on the pressure monitored by the second pressure monitoring member 27, the draining of liquid in the metering tube 21 can be controlled through turning on the pressure servo valve to varying degrees, so that the second pressure monitoring member 27 is in a non-pressurized state, thus ensuring that the first pressure monitoring member 22 will not be affected by the pressurized desorption, and that the pressure of the water column in the metering tube 21 can be accurately measured. Therefore, the desorbed gas amount of the sample to be desorbed 100 can be accurately measured.

Specifically, in one embodiment, the second pressure monitoring member 27 is a pressure sensor. As shown in FIG. 1, in one embodiment, the metering tube 21 is provided with a water inlet port 213, and the water drain metering assembly 20 further includes a water inject line 28 and an inject pressure servo valve 43. One end of the water inject line 28 is connected to the water inlet port 213, and the inject pressure servo valve 43 is provided on the water inject line 28.

In the above arrangement, the water inject line 28 is able to inject water into the metering tube 21 to ensure that there is sufficient water therein. Thus the metering tube 21 is able to collect desorbed gas through the water drainage and gas collection method.

Specifically, in one embodiment, the inject pressure servo valve 43 is a pressure servo valve. As shown in FIG. 1, in one embodiment, the water drain metering assembly 20 further comprises a draining and injecting assembly 29 in communication with the other end of the water inject line 28.

In the above arrangement, the draining and injecting assembly 29 is configured to provide water to the metering tube 21, in order to ensure that the water inject line 28 is able to inject sufficient water into the metering tube 21. Thus the metering tube 21 can collect desorbed gas through the water drainage and gas collection method.

Specifically, as shown in FIG. 1, in one embodiment, the draining and injecting assembly 29 comprises a water tank 291, an inlet pipe 292, and an outlet pipe 293. One end of the inlet pipe 292 is connected to the water tank 291, and the other end thereof is connected to the other end of the water inject line 28. One end of the outlet pipe 293 is connected to the water tank 291, and the other end thereof is connected to the other end of the drain line 26. Specifically, as shown in FIG. 1, in one embodiment, the outlet pipe 293 is connected to the drain line 26.

It should be noted that when water is injected through the draining and injecting assembly 29, the drain pressure servo valve 42 is turned off, while the inject pressure servo valve 43 is turned on. Water is injected into the metering tube 21 through a normally-open submersible pump 294. When water is drained through the draining and injecting assembly 29, the drain pressure servo valve 42 is turned on, while the inject pressure servo valve 43 is turned off.

Specifically, as shown in FIG. 1, in one embodiment, the normally-open submersible pump 294 is provided within the water tank 291 for pumping water from the water tank 291 into the metering tube 21. In the embodiment as shown in FIG. 1, specifically, the gas exhausting assembly 30 comprises an exhaust line 31 and a fourth control valve 44. One end of the exhaust line 31 is connected to the water drain metering assembly 20, and the fourth control valve 44 is arranged on the exhaust line 31. It should be noted that the exhaust line 31 is able to vent the desorbed gas collected in the metering tube 21 to an external desorbed gas collection device.

Specifically, in one embodiment, the fourth control valve 44 is a solenoid discharging valve. As shown in FIG. 1, in one embodiment, the desorbed gas amount testing device further comprises a control assembly 50 electrically connected to the water drain metering assembly 20 and the gas exhausting assembly 30.

Specifically, as shown in FIG. 1, in one embodiment, the control assembly 50 comprises a computer control system 51 and an atmospheric environment sensor 52. The atmospheric environment sensor 52 comprises a set of temperature and pressure sensors which are electrically connected to the computer control system 51 and configured to provide feedback on the pressure and temperature of the environment outside the device. The computer control system 51 is also electrically connected to the first control valve 41, the drain pressure servo valve 42, the inject pressure servo valve 43, the fourth control valve 44, the first pressure monitoring member 22 and the second pressure monitoring member 27, and configured to receive feedback on the pressure from the first pressure monitoring member 22 and the second pressure monitoring member 27, and control the actions of the above control valves also.

The present invention also relates to a method for measuring the desorbed gas amount of the sample to be desorbed 100, which comprises the following steps.

In Step 1, the sample to be desorbed is placed in the sample desorption tank, for heating and desorption.

In Step 2, the pressure of the water column in the metering tube is measured by the water drain metering assembly, displaying the liquid level height of the water column in the metering tube.

In Step 3, the desorbed gas amount within a single cycle is calculated according to the desorbed gas amount measurement formula.

In Step 4, the desorbed gas amounts within a plurality of consecutive single cycles are calculated according to Steps 2 and 3.

In Step 5, the desorbed gas amounts within the plurality of consecutive single cycles are added up to obtain the desorbed gas amount of the sample to be desorbed.

It should be noted that the desorption time T of the sample to be desorbed 100 (the time period from the start to the end of gas production) consists of a plurality of consecutive time periods T1 (each T1 is a single cycle). For example, T1 can be set to 30 seconds. The desorbed gas amount testing device according to the present application is able to measure the desorbed gas amounts within a plurality of consecutive single cycles, which are added up to obtain the desorbed gas amount of the sample to be desorbed 100.

A complete embodiment of the present application is described in detail below with reference to FIG. 1.

The present invention comprises a sealed sample desorption tank 10. An on-site cored shale sample is placed in the sample desorption tank 10 for heating and desorption. A normally-open solenoid valve is connected to an upper end of the sample desorption tank 10, for controlling the discharge of the desorbed gas from the sample desorption tank 10. The tee 23 is connected to the normally-open solenoid valve, for connecting to the sample desorption tank 10, the metering tube 21 and the solenoid discharging valve.

An upper end of the glass tube is connected to the solenoid discharging valve which is configured to discharge the desorbed gas from the sample desorption tank 10 collected in the glass tube. A pressure sensor is arranged at a bottom portion of the glass tube for measuring the pressure of the water column in the glass tube in real time. A draining pressure servo valve is connected to a lower end of the glass tube, and can be turned on to varying degrees controlled by a gas pressure sensor based on the pressure of the desorbed gas, thereby controlling the outflow of liquid in the glass tube. The other end of the draining pressure servo valve is connected to a communicating pipe (the outlet pipe 293) in communication with a bottom portion of the water tank 291. As the gas inside the sample desorption tank 10 enters the glass tube, the draining pressure servo valve is turned on, whereby the liquid in the glass tube flows into the water tank 291 through the communicating pipe, thus realizing non-pressurized water drainage and gas collection.

The glass tube does not fill up with liquid. The liquid level is controlled by the high-precision pressure sensor (the first pressure monitoring member 22) at the bottom portion of the glass tube. When the liquid level in the glass tube reaches a set maximum height D, the pressure of the water column is calibrated at this time to Pmax. When the liquid level in the glass tube reaches a set minimum height E, the pressure of the water column is calibrated to Pmin. The liquid level difference between the maximum (D) and the minimum (E) liquid level in the glass tube is calibrated to Hmax. An inner diameter area S of the glass tube remains constant, so that a maximum volume of liquid discharged from the glass tube in a single cycle also remains constant, i.e., Vmax=Hmax*S.

When the desorbed gas in the glass tube reaches the minimum liquid level E, the computer control system 51 automatically turns off the normally-open solenoid valve, turns on the solenoid discharging valve to discharge gas, and at the same time turns on the injecting pressure servo valve at the lower end of the glass tube. The water in the water tank 291 is pumped into the glass tube via the communicating pipe through the normally-open submersible pump 294 submerged inside the water tank 291, so that the liquid level in the glass tube reverts to the maximum liquid level D. Then the solenoid discharging valve is turned off, and the normally-open solenoid valve is turned on.

Therefore, the above device according to the present invention realizes gas collection through the water drainage and gas collection method. With the combination of the desorbed gas pressure sensor and the pressure servo valve, it is able to avoid measurement under pressure, and there is no need to take into consideration the compositions of the gas. The desorbed gas amount is measured directly based on the reading of the pressure sensor at the bottom of the water column, which has small data error as well as a high degree of credibility and stability.

The gas pressure sensor is provided between the normally-open solenoid valve and the tee 23. The gas pressure sensor is intended to measure the pressure of gas passing therethrough. When the pressure is greater than 0, the valve is turned on to varying degrees based on the pressure of the desorbed gas at the gas pressure sensor, which can eliminate the data error of the pressure sensor at the bottom of the water column due to the gas pressure in the glass tube. Therefore, the authentic water column pressure data obtained by the pressure sensor at the bottom of the water column is substituted into the formula, in order to directly obtain the desorbed gas amount data, which is more stable and reliable. The control system 50 comprises an atmospheric environment sensor 52 and a computer control system 51. The atmospheric environment sensor 52 is configured to collect the ambient temperature and atmospheric pressure value. In the meantime, the computer control system 51 is able to integrally control the normally-open solenoid valve, the solenoid discharging valve, the pressure sensor at the bottom of the water column, the pressure servo valves for injecting and draining, and the gas pressure sensor, in order to collect real-time data. Thus, the automated control required for the device according to the present invention can be realized.

In an alternative embodiment not shown in the drawings of the present application, each glass tube is provided separately with a normally-open solenoid valve, a solenoid discharging valve, a pressure sensor at the bottom of the water column, a pressure servo valve for injecting and draining, and a gas pressure sensor, thus forming a separate set of metering unit for a separate sample to be desorbed 100. The water tank 291 is in communication with a plurality of metering units via the communicating pipe and the normally-open submersible pump 294. This structure enables simultaneous analysis of a plurality of samples to be desorbed 100, so that the high-density and fast-paced coring evaluation can be completed efficiently and conveniently.

The on-site desorbed gas amount measuring method performed by means of the on-site desorbed gas amount testing device will be described as follows in more detail. The method comprises the following steps.

Step A. The device is initialized, and the computer automatically turns on the injecting pressure servo valve, so that the liquid level in the glass tube reaches the maximum liquid level height D. The solenoid discharging valve is turned off, and the computer control system records the temperature and pressure at the atmospheric environment sensor.

Step B. The shale sample is placed into the sealed sample desorption tank, and the gas desorbed after heating enters the glass tube via the normally-open solenoid valve and the tee.

Step C. The gas pressure sensor arranged between the normally-open solenoid valve and the tee collects the pressure of the desorbed gas in real time. When the real-time pressure Pgas in the glass tube is greater than 0, the computer automatically turns on the draining pressure servo valve at the lower end of the glass tube. The liquid in the glass tube is controlled to enter the communicating pipe and then the water tank by turning on the draining pressure servo valve to varying degrees, so that the gas pressure sensor remains in the non-pressurized state. At this time, the pressure sensor at the bottom of the water column collects the pressure of the water column Pwater in real time.

Step D. When the liquid level in the glass tube drops to the set minimum height E, Pwater=Pmin. At this time, the computer automatically turns off the normally-open solenoid valve, and turns on the solenoid discharging valve to discharge gas. In the meantime, the injecting pressure servo valve at the lower end of the glass tube is turned on, and the liquid in the water tank is pumped into the glass tube through the normally-open submersible pump.

Step E. When the liquid level in the glass tube reverts to the set maximum liquid level D and the pressure value of the gas pressure sensor is 0, the device is reverted to an initial state. In this case, the solenoid discharging valve is turned off, and the normally-open solenoid valve is turned on. Then the next desorption cycle is ready to be initiated.

Step F. The desorbed gas amount is calculated based on the pressure measured by the pressure sensor at the bottom of the water column in real time.

The calculation of the desorbed gas amount in Step F is illustrated below in detail.

According to the data from Step A and Step C, the constant volume Vmax of gas discharged from the glass tube is calibrated, Vmax=Hmax*S (Equation 1), wherein Hmax denotes the calibrated maximum level difference in the glass tube, and S denotes an area of a cross-section of the glass tube.

Assuming that the readings of the water column pressure are P1 and P2 at any two times T1 and T2, and the gas is discharged from the glass tube in n single cycles during an interval between two measurements, the desorbed gas amount during the interval (the desorbed gas amount in a single cycle) is calculated with an equation as follows:

$$V=(P1-P\text{min}+P\text{max}-P2)S/\rho g+nV\text{max},$$

wherein Pmax and Pmin denote pressure values at the pressure sensor when the liquid level in the glass metering tube is the set maximum height (D) and the set minimum height (E), respectively, S denotes the area of the cross-section of the glass metering tube, ρ denotes a density of the liquid in the glass metering tube, and g denotes gravity acceleration. The desorbed gas amount can be further converted to an amount in a standard state based on temperatures and atmospheric pressures recorded at different times.

In the present invention, it should be understood that the terms “upper”, “lower”, “bottom”, “top”, “front”, “rear”, “internal”, “external”, “left”, “right” and the like indicate orientations or positions based on those shown in the drawings, which are used only for simplified and illustrative purposes of the present invention, and are not intended to indicate or imply a particular orientation, or the configuration and operation of a device or element in a particular orientation. Therefore, the above terms are not intended to restrict the present invention.

Although the present invention is described hereinabove with reference to the particular embodiments, it should be understood that these embodiments are provided to illustrate the principle and the application of the present invention merely. Therefore, it is possible to modify the exemplary embodiments and define other arrangements as long as they fall within the spirit and scope of the present invention defined in the appending claims. Different dependent claims and the technical features described in this context may be combined in a manner different from those in the original claims. It is also to be understood that the technical features described in combination with separate embodiments may be applied to other embodiments as described.

The invention claimed is:

1. A desorbed gas amount testing device, comprising:

a sample desorption tank, for storing a sample to be desorbed and providing a desorption environment for the sample to be desorbed;

a water drain metering assembly, comprising a metering tube which is configured to display a liquid level height and receive gas desorbed from the sample desorption tank, the metering tube being connected to a draining and injecting assembly for draining water through a drain line or injecting water through an inject line, a first pressure monitoring member for monitoring a liquid pressure in the metering tube, and a second pressure monitoring member for monitoring a gas pressure in the metering tube, wherein an injecting pressure servo valve is arranged on the inject line, and a draining pressure servo valve is arranged on the drain line;

a gas exhausting assembly, which is in communication with the water drain metering assembly and configured to exhaust desorbed gas therein; and a control system, for controlling the desorbed gas to enter the metering tube, controlling the draining and injecting assembly to drain or inject water, and controlling the gas exhausting assembly to exhaust the desorbed gas, wherein the control system is configured to, when the desorbed gas enters the metering tube, control a speed at which the draining and injecting assembly drains water, so that the second pressure monitoring member remains in a non-pressurized state; and the control system is further configured to, when a pressure of the first pressure monitoring member reaches a set minimum value, suspend the desorbed gas entering the metering tube, control the gas exhausting assembly to exhaust gas, and control the draining and injecting assembly to inject water into the metering tube, until the pressure of the first pressure monitoring member reaches a set maximum value.

2. The desorbed gas amount testing device according to claim 1, characterized in that an elastic sleeve is arranged within the sample desorption tank and connected to a pressurizing and depressurizing mechanism, which is configured to pressurize or depressurize the sample to be desorbed in the sample desorption tank through the elastic sleeve, a compacting mechanism for compacting the sample to be desorbed being arranged on an upper portion of the sample desorption tank.

3. The desorbed gas amount testing device according to claim 2, characterized in that an upper retaining ring and a lower retaining ring are arranged on an inner wall of the sample desorption tank, and the elastic sleeve comprises a vertical first rubber sleeve which is provided with an upper edge at an upper end thereof and a lower edge at a lower end thereof, wherein the upper edge is sealingly connected to the upper retaining ring, and the lower edge is sealingly connected to the lower retaining ring, with an annular space formed between the inner wall of the sample desorption tank and an outer wall of the elastic sleeve, the pressurizing and depressurizing mechanism being configured to pressurize or depressurize the annular space.

4. The desorbed gas amount testing device according to claim 3, characterized in that a top cover is arranged at a top portion of the sample desorption tank, and the compacting mechanism comprises a second rubber sleeve arranged on the top cover, wherein a resilient member is arranged between the second rubber sleeve and the top cover, and configured to enable the second rubber sleeve to compact the sample to be desorbed through resilience.

5. The desorbed gas amount testing device according to claim 1, characterized in that a plurality of metering tubes is provided in parallel inside a box, each of the metering tubes being connected to a corresponding sample desorption tank, and a sealing joint connected to the metering tube is provided at each of upper and lower portions of the box, wherein a pressing spring is provided on the sealing joint at the upper portion of the box, and the metering tube is detachable through the pressing spring.

6. The desorbed gas amount testing device according to claim 5, characterized in that a number of metering tubes with different sizes are provided, each of which has a same joint at each end thereof, and a scaled central body with a different diameter, wherein a suitable metering tube is selected for the number of metering tubes with different sizes based on precision as needed in testing.

7. The desorbed gas amount testing device according to claim 1, characterized in that the metering tube includes a gas inlet and outlet port and a water inlet and outlet port, wherein the sample desorption tank is connected to the gas inlet and outlet port via a first line, and the draining and injecting assembly is connected to the water inlet and outlet port; and the gas exhausting assembly is connected to the gas inlet and outlet port via a second line.

8. The desorbed gas amount testing device according to claim 7, characterized in that the water inlet and outlet port comprises a water inlet port and a water outlet port, and the draining and injecting assembly comprises a water tank which is connected to the water inlet port via the inject line and the water outlet port via the drain line.

9. The desorbed gas amount testing device according to claim 7, characterized in that the gas inlet and outlet port of the metering tube is connected to a tee, which is further connected to the first line and the second line; and the second pressure monitoring member and an inlet valve are arranged on the first line, and a discharging valve is arranged on the second line.

10. A method for measuring desorbed gas amount of a sample to be desorbed, characterized in that the method is performed by means of the desorbed gas amount testing device according to claim 1, and comprises:

Step 1, placing the sample to be desorbed in the sample desorption tank for heating and desorption;

Step 2, delivering the desorbed gas into the metering tube, draining water through the draining and injecting assembly to keep the second pressure monitoring member in a constant non-pressurized state, and discharging the gas in the metering tube and injecting water through the draining and injecting assembly to an initial state when a liquid pressure in the metering tube monitored by the first pressure monitoring member reaches a minimum value, thereby completing one cycle of desorption;

Step 3, calculating the desorbed gas amount in one cycle; and

Step 4, calculating a total desorbed gas amount based on liquid level heights in the metering tube at a start time and an end time, and a number of cycles.

11. The method according to claim 10, characterized in that the desorbed gas amount in one cycle is calculated with an equation as follows:

$$Vmax = Hmax * S,$$

wherein Hmax denotes a maximum liquid level difference in the metering tube, and S denotes an area of a cross-section of the metering tube.

12. The method according to claim 11, characterized in that a set maximum pressure value in the metering tube is Pmax, and a set minimum pressure value in the metering tube is Pmin, the method further comprises:

when a water column pressure P monitored by the first pressure monitoring member reaches Pmin, stopping the desorbed gas from entering the metering tube, turning on the gas exhausting assembly, and controlling the draining and injecting assembly to inject water to the metering tube, through the control system; and when the water column pressure P monitored by the first pressure monitoring member reaches Pmax, turning off the gas exhausting assembly, discharging the desorbed gas into the metering tube, and controlling the draining and injecting assembly to discharge water from the metering tube.

13. The method according to claim 12, characterized in that assuming readings of the water column pressure are P1 and P2 at any two times T1 and T2 respectively, and gas is discharged from the metering tube in n cycles during an interval between two measurements, the desorbed gas amount during the interval is calculated as follows:

$$V = (P1 - Pmin + Pmax - P2)S/\rho g + nVmax,$$

wherein S denotes the area of the cross-section of the metering tube, ρ denotes a density of the liquid in the metering tube, and g denotes gravity acceleration; and the method further comprises converting the desorbed gas amount to an amount in a standard state based on temperatures and atmospheric pressures recorded at different times.

* * * * *